（12） United States Patent
Turocy et al.

(10) Patent No.: US 9,613,502 B2
(45) Date of Patent: Apr. 4, 2017

(54) WIRELESS INTERFACE FOR ATM CASSETTE AND MONEY TRANSPORT

(71) Applicants: Ken Turocy, Wadsworth, OH (US);
Bryan Simmons, North Canton, OH (US); Eric Klein, Massillon, OH (US);
Dustin Boley, Carrolton, OH (US);
David Nikkel, Wooster, OH (US);
Daniel Bissler, Mogadore, OH (US);
Mike Ryan, Canton, OH (US)

(72) Inventors: Ken Turocy, Wadsworth, OH (US);
Bryan Simmons, North Canton, OH (US); Eric Klein, Massillon, OH (US);
Dustin Boley, Carrolton, OH (US);
David Nikkel, Wooster, OH (US);
Daniel Bissler, Mogadore, OH (US);
Mike Ryan, Canton, OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 14/720,906

(22) Filed: May 25, 2015

(65) Prior Publication Data

US 2015/0364015 A1 Dec. 17, 2015

Related U.S. Application Data

(60) Provisional application No. 62/002,358, filed on May 23, 2014.

(51) Int. Cl.
*G07F 19/00* (2006.01)
*G06K 19/06* (2006.01)
(Continued)

(52) U.S. Cl.
CPC .............. *G07F 19/209* (2013.01); *G06F 3/14* (2013.01); *G06K 19/06037* (2013.01);
(Continued)

(58) Field of Classification Search
CPC ................ G07F 19/209; G07F 19/201; G06K 19/06112; G06K 19/06037; G07D 11/0078;
(Continued)

(56) References Cited

U.S. PATENT DOCUMENTS 9,141,876 B1 * 9/2015 Jones ....................... G06K 9/60
2004/0173672 A1 9/2004 Washington et al.
(Continued)

FOREIGN PATENT DOCUMENTS

CN 203433546 2/2014

OTHER PUBLICATIONS

International Search Report and Written Opinion of corresponding PCT application.

*Primary Examiner* — Kristy A Haupt
(74) *Attorney, Agent, or Firm* — Black, McCuskey, Souers & Arbaugh, LPA

(57) ABSTRACT

In an example embodiment, there is described herein an apparatus comprising a cassette operable to store documents, the cassette having an external surface, an electrophoretic display coupled with the external surface, and a wireless interface coupled with the cassette and operably coupled with the electrophoretic display. In particular embodiments, the electrophoretic display is operable to receive data representative of configuration from a wireless device in data communication with the wireless interface.

20 Claims, 7 Drawing Sheets

(51) Int. Cl.
    *G07D 11/00*     (2006.01)
    *G06F 3/14*     (2006.01)
    *G06F 3/147*     (2006.01)
    *G09G 3/34*     (2006.01)

(52) U.S. Cl.
    CPC .... *G06K 19/06112* (2013.01); *G07D 11/0042* (2013.01); *G07D 11/0066* (2013.01); *G07D 11/0078* (2013.01); *G07F 19/201* (2013.01); *G06F 3/147* (2013.01); *G09G 3/344* (2013.01); *G09G 2370/16* (2013.01)

(58) Field of Classification Search
    CPC .. G07D 11/0066; G07D 11/0042; G06F 3/14; G06F 3/147
    See application file for complete search history.

(56) References Cited

U.S. PATENT DOCUMENTS

| | | |
|---|---|---|
| 2006/0028341 A1 | 2/2006 | Barthole et al. |
| 2006/0279527 A1* | 12/2006 | Zehner ................... G06Q 30/00 345/107 |
| 2007/0194106 A1 | 8/2007 | Force et al. |
| 2009/0014542 A1 | 1/2009 | Gelbman |
| 2010/0072280 A1* | 3/2010 | McGill ............ G06K 19/06206 235/462.13 |
| 2011/0050756 A1* | 3/2011 | Cassidy ................... G09G 3/20 345/690 |
| 2012/0194319 A1 | 8/2012 | Kang et al. |

* cited by examiner

```
                                500
                                 ↘
                         ┌─────────────────────────────┐
                         │ READ FROM CASSETTE:         │─502
                         │ SERIAL #: DBD-CJ2694DF      │
                         ├─────────────────────────────┤
                         │ TERMINAL #:  AJ7H           │─504
                         ├─────────────────────────────┤
                         │ CURRENCY: $20     ▭         │─508
                         ├─────────────────────────────┤─500
                         │ NOTE COUNT: 197             │─510
                         ├─────────────────────────────┤
                         │ BALANCE: $3940              │─512
                         ├─────────────────────────────┤
                         │ VIEW CASSETTE METRICS       │─514
                         ├─────────────────────────────┤
                         │ UPDATE COUNTS               │─516
                         ├─────────────────────────────┤
                         │ UPDATE CASSETTE INFO        │─518
                         └─────────────────────────────┘
```

FIG. 5

```
    600
     ↘
   ┌─────────────────────────────────┐
   │ CASSETTE METRICS                │
   │ OVER LIFE TIME:                 │
   │ 327,459              327,459    │─602
   │   CASSETTE INSERTIONS:  200     │─604
   │   FEED FAILS:             1     │─606
   │   DOUBLES:              100     │─608
   ├─────────────────────────────────┤
   │ LAST VISIT                      │
   │ FEED FAILS              0       │─610
   │ DOUBLES:                0       │─612
   ├─────────────────────────────────┤
   │ TAMPER DETECTED        NO       │─614
   ├─────────────────────────────────┤
   │ BATTERY:             GOOD       │─616
   └─────────────────────────────────┘
```

FIG. 6

WIRELESS INTERFACE FOR ATM CASSETTE AND MONEY TRANSPORT

CROSS REFERENCE TO RELATED APPLICATIONS

This application claims the benefit under 35 U.S.C. §119 (e) of U.S. Provisional Application No. 62/002,358, filed May 23, 2014.

TECHNICAL FIELD

The present disclosure relates generally to automated sheet handling equipment such as automated banking machines, automated transaction machines and automated teller machines (collectively "ATMs") and currency and document handling equipment.

BACKGROUND

ATMs are configured to perform a variety of functions and transactions, including receiving and dispensing currency notes ("notes"). Other types of transaction machines dispense notes and other types of sheets to users such as bank tellers, cashiers and other service providers. Other types of automated transaction machines dispense items such as tickets, travelers checks, vouchers or gaming tickets. Automated transaction machines generally dispense such materials while assessing appropriate charges and credits to the respective accounts of the user, the machine owner or operator and the provider of dispensed currency or materials. As referred to herein, ATMs include any machine or device and related methods of operation and use for carrying out transactions including transfers of value.

ATMs that dispense, or receive and dispense notes other types of sheets or tokens or coins representative of value are generally constructed to prevent access to the supply of sheets or notes within the machine by unauthorized persons. Most ATMs are configured with a secure chest, safe or other lockable enclosure. Access to the secure chest is controlled by a lock or other security device. The chest is typically configured to include or receive multiple storage compartments or containers for different types of notes or items for storage and dispense. A common configuration for note storage within the secure chest is in the form of multiple containers or cassettes or media cassettes for receiving and storing notes in a stack or row and also dispensing notes. Cassettes are manually loaded, for example at the beginning of a business day, with a supply of notes the denomination and number of which is recorded manually or otherwise. The content of a cassette may be determined by the ATM computer programmed to maintain a transaction log or by remote monitoring of the number and type of transactions performed. Also, cassettes may be configured with one or more content sensors or indicators which operate based upon the physical size of a stack or bundle of notes in the cassette or the position of a pressure plate in the cassette which bears against a stack of notes.

When a cassette requires reloading, or required reloading is anticipated for example by monitored status or predicted status based upon usage patterns, the chest is opened and the cassette or cassettes removed, a new supply of notes of the desired currency and denomination loaded, and re-installed into the chest of the ATM, and the chest closed and locked. Some cassettes are also equipped with a lock to control access to the cassette contents. With the cassette or cassettes thus reloaded, this change in status is recorded in the ATM control system and/or monitoring software.

Disadvantages with these configurations include the inability to more precisely control access to cassettes and to accurately and easily determine and record cassette status.

BRIEF DESCRIPTION OF THE DRAWINGS

The accompanying drawings incorporated herein and forming a part of the specification illustrate the example embodiments.

FIG. 5 is an image of a wireless device with a representative display of an application for wireless communication with an automated banking machine cassette as disclosed herein;

FIG. 6 is a representative display of an application for wireless communication with an automated banking machine cassette as disclosed herein;

OVERVIEW OF EXAMPLE EMBODIMENTS

Figure 1:
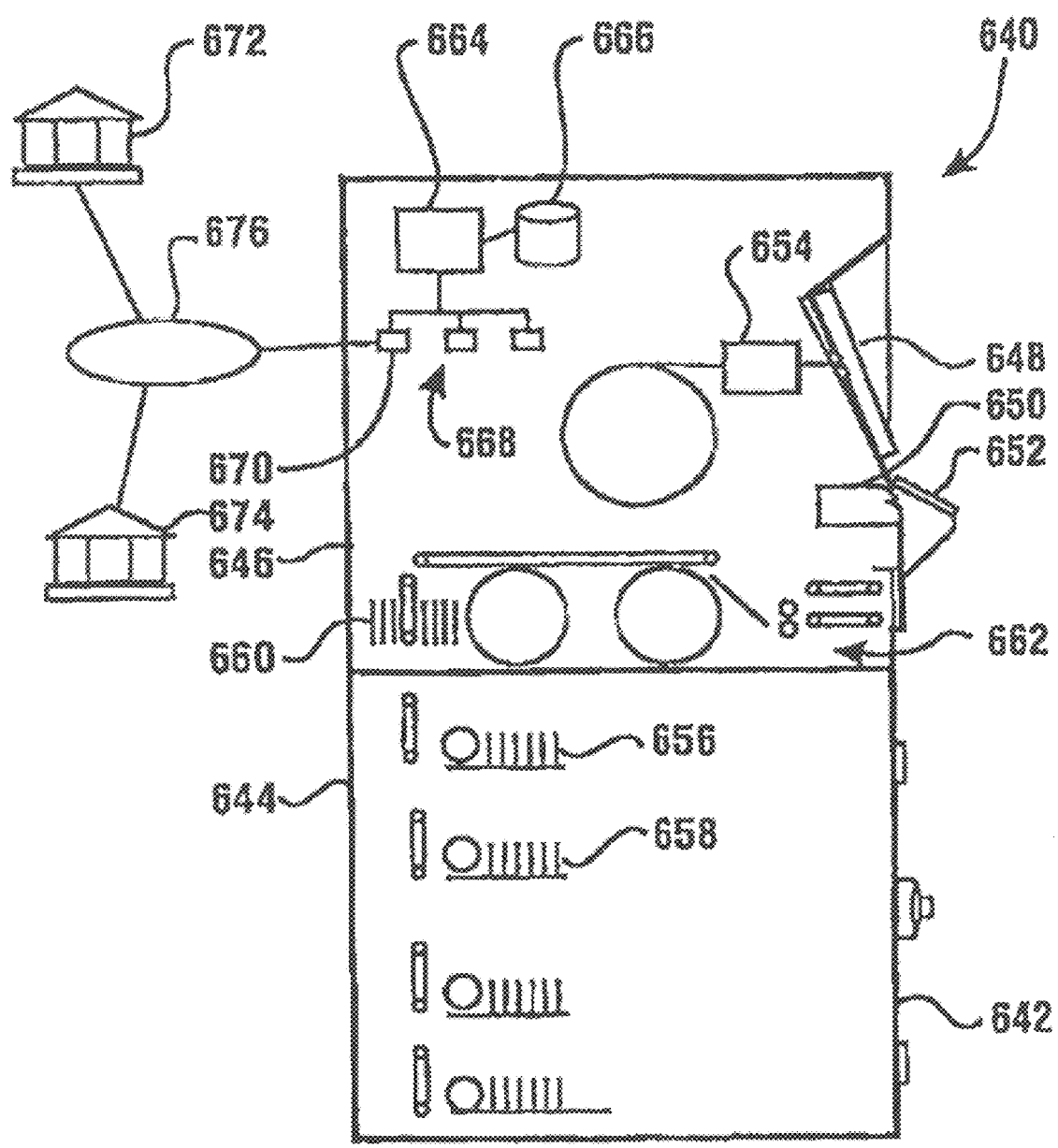
FIG. 1 is a schematic view showing an automated banking machine with an example of a deposit accepting device and a cassette.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a cassette operable to store documents, the cassette having an external surface, an electrophoretic display coupled with the external surface, and a wireless interface coupled with the cassette and operably coupled with the electrophoretic display. In particular embodiments, the electrophoretic display is operable to receive data representative of configuration from a wireless device in data communication with the wireless interface.

In accordance with an example embodiment, there is disclosed herein an apparatus, comprising a wireless interface and a processor coupled with the wireless interface. The processor is operable to communicate with a electrophoretic display coupled with a cassette via the wireless interface. The cassette is operable to store documents and one of a group consisting of dispense and accept documents. The processor is operable to send instructions to configure the electrophoretic display via the wireless interface.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The present disclosure includes innovations and improvements to ATM cassettes and media cassettes (referred to herein collectively and generally as "cassettes"), including the use of hardware and software configured for wireless interface and communication between cassettes and wireless devices such as portable cellular telephones, smart phones or tablets. In one example embodiment, cassettes are configured for near field communication (NFC) with one or more wireless devices. As further described, wireless ATM cassette interfaces of the present disclosure provide and enable secure data channels between a cassette and authorized wireless devices when a cassette is either installed or removed from an ATM, allow service personnel to check on the status of the cassette without opening the cassette, allow cash in transit teams to obtain accurate status records of currency amounts in individual cassettes and multiple cassettes throughout a branch system, and utilizes existing cellular communications networks to facilitate transfer and exchange of low level data to multiple users of such information.

In a representative embodiment, a circuit card is contained in a media cassette, the circuit card including a printed circuit board (PCB) near field communication (NFC) antennae and accompanying circuitry configured to interact with a smart phone or other wireless devices via a communications protocol such as near field communication (NFC). The media cassette circuit card also contains a shared memory device which allows data exchange from a NFC compliant end device to a microprocessor internal to the cassette.

FIG. 1 shows an alternative example embodiment of an automated banking machine 640. Banking machine 640 includes a housing 642. Housing 642 of the machine includes a chest portion 644 and an upper housing portion 646. Chest portion 644 provides a secure storage area in an interior portion thereof. The interior of the chest portion may be used for example to store valuable sheets such as currency notes, travelers checks, scrip, checks, tickets or other valuable sheets that have been received by and/or that are to be dispensed from the machine. The chest portion includes a suitable chest door and lock for providing authorized access thereto. The upper housing portion 646 of an example embodiment also includes suitable access doors or other mechanisms to enable authorized persons to obtain access to items therein. Examples of chest portions are shown in U.S. Pat. No. 7,000,830 and U.S. Application 60/519,079, the disclosures of which are incorporated herein by reference in their entirety.

The example automated banking machine 640 includes output devices including a display 648. Other output devices may include for example speakers, touch pads, touch screens or other items that can provide user receivable outputs. The outputs may include outputs of various types including for example, instructions related to operation of the machine. The example automated banking machine further includes input devices. These may include for example a card reader 650 or a biometric reader. The biometric type of reading device may identify a machine user by a characteristic thereof. Such biometric reading devices may include for example a fingerprint reader, iris scanner, retina scanner, voice recognition device, hand scanner, DNA scanner, implanted chip reader, facial recognition reader, and/or software or other devices.

The card reader 650 is operative to read indicia included on cards that are associated with a user and/or a user's account. Card readers may be operative to read indicia for example, indicia encoded on a magnetic stripe, data stored in an electronic memory on the card, radiation transmitted from an item on the card such as a radio frequency identification (RFID) chip or other suitable indicia. User cards represent one of a plurality of types of data bearing records that may be used in connection with activating the operation of example machines. In other embodiments other types of data bearing records such as cards, tokens, tags, sheets or other types of devices that include data that is readable therefrom, may be used.

In example embodiments data is read from a card through operation of a card reader. The card reader may include features such as those disclosed in U.S. Pat. No. 7,118,031, the disclosure of which is incorporated herein by reference in its entirety. The example automated banking machine is operative responsive to at least one processor in the machine to use data read from the card to activate or allow operation of the machine by authorized users so as to enable such users to carry out at least one transaction. For example the machine may operate to cause data read from the card and/or data resolved from card data and other inputs or data from the machine, to be compared to data corresponding to authorized users. This may be done for example by comparing data including data read from the card to data stored in or resolved from data stored in at least one data store in the machine. Alternatively or in addition, the automated banking machine may operate to send one or more messages including data read from the card or data resolved therefrom, to a remote computer.

The remote computer may operate to cause the data received from the machine to be compared to data corresponding to authorized users based on data stored in connection with one or more remote computers. In response to the positive determination that the user presenting the card is an authorized user, one or more messages may be sent from the remote computer to the automated banking machine so as to enable operation of features thereof. This may be accomplished in some example embodiments through features such as those described in U.S. Pat. Nos. 7,284,695 and/or 7,266,526, the disclosures of each of which are incorporated herein by reference in their entirety. Of course these approaches are example and in other embodiments other approaches may be used.

The example automated banking machine further includes a keypad 652. Keypad 652 provides a user input device which includes a plurality of keys that are selectively actuatable by a user. Keypad 652 may be used in example embodiments to enable a user to provide a personal identification number (PIN). The PIN data may be used to identify authorized users of the machine in conjunction with data read from cards so as to assure that machine operation is only carried out for authorized users. Of course the input devices discussed herein are example of numerous types of input devices that may be used in connection with automated banking machines.

The example automated banking machine further includes other transaction function devices. These may include for example, a printer 654. In an example embodiment printer 654 is operative to print receipts for transactions conducted by users of the machine. Other embodiments of automated banking machines may include other types of printing devices such as those suitable for printing statements, tickets or other types of documents. The example automated banking machine further includes a plurality of other devices. These may include for example, a sheet dispensing device 656. Such a device may be operative to serve as part of a cash dispenser device which selectively dispenses sheets such as currency notes from storage. It should be understood that for purposes of this disclosure, a cash dispenser device, is one or more devices that can operate to cause currency stored in the machine to be dispensed from the machine. Other devices may include a recycling device 658. The recycling device may be operative to receive sheets into a storage location and then to selectively dispense sheets therefrom. The recycling device may be of a type shown in U.S. Pat. Nos. 6,302,393 and 6,131,809, the disclosures of which are incorporated herein by reference in their entirety. It should be understood that a recycling device may operate to recycle currency notes and may in some embodiments, a cash dispenser may include the recycler device. Further an example embodiment may include sheet storage devices 660 of the type previously described herein which are operative to selectively store sheets in compartments.

The example automated banking machine 640 includes a deposit accepting device 662. The deposit accepting device of an example embodiment is operative to receive and analyze sheets received from a machine user. The example deposit accepting device is also operative to deliver sheets from the machine to machine users. It should be understood that in other embodiments additional or different deposit accepting devices may be used. For example, a recycling device as well as a note acceptor that receives currency notes are also deposit accepting devices. Further for purposes of this disclosure a deposit accepting device may alternatively be referred to as a sheet processing device.

The example automated banking machine 640 further includes a processor schematically indicated 664. The processor is in operative connection with a data store schematically indicated 666. The processor 664 and data store 666 are operative to execute instructions which control and cause the operation of the automated banking machine 640. It should be understood that although one processor and data store are shown, embodiments of automated banking machines may include a plurality of processors and data stores which operate to control and cause operation of the devices of the machine.

The processor 664 is shown in operative connection with numerous transaction function devices schematically indicated 668. Transaction function devices 668 include devices in the machine that the processor 664 is operative to cause to operate. These transaction function devices 668 may include devices such as a card reader, printer, keypad, deposit accepting device, sheet dispenser, recycler and other devices in or that coupled with the machine. In an example embodiment the processor 664 is also in operative connection with a communication device 670. The communication device 670 is operative to enable the automated banking machine 640 to communicate with one or more remote servers 672, 674 through at least one network 676. It should be understood that the communication device 670 may suitably comprise a plurality of interfaces of types suitable for communication through one or more types of public and/or private networks so as to enable the automated banking machine 640 to communicate with a server 672,674 and to enable machine users to carry out transactions. Of course it should be understood that this automated banking machine 640 is an example and that automated banking machines may have numerous other types of configurations and capabilities.

Figure 2:
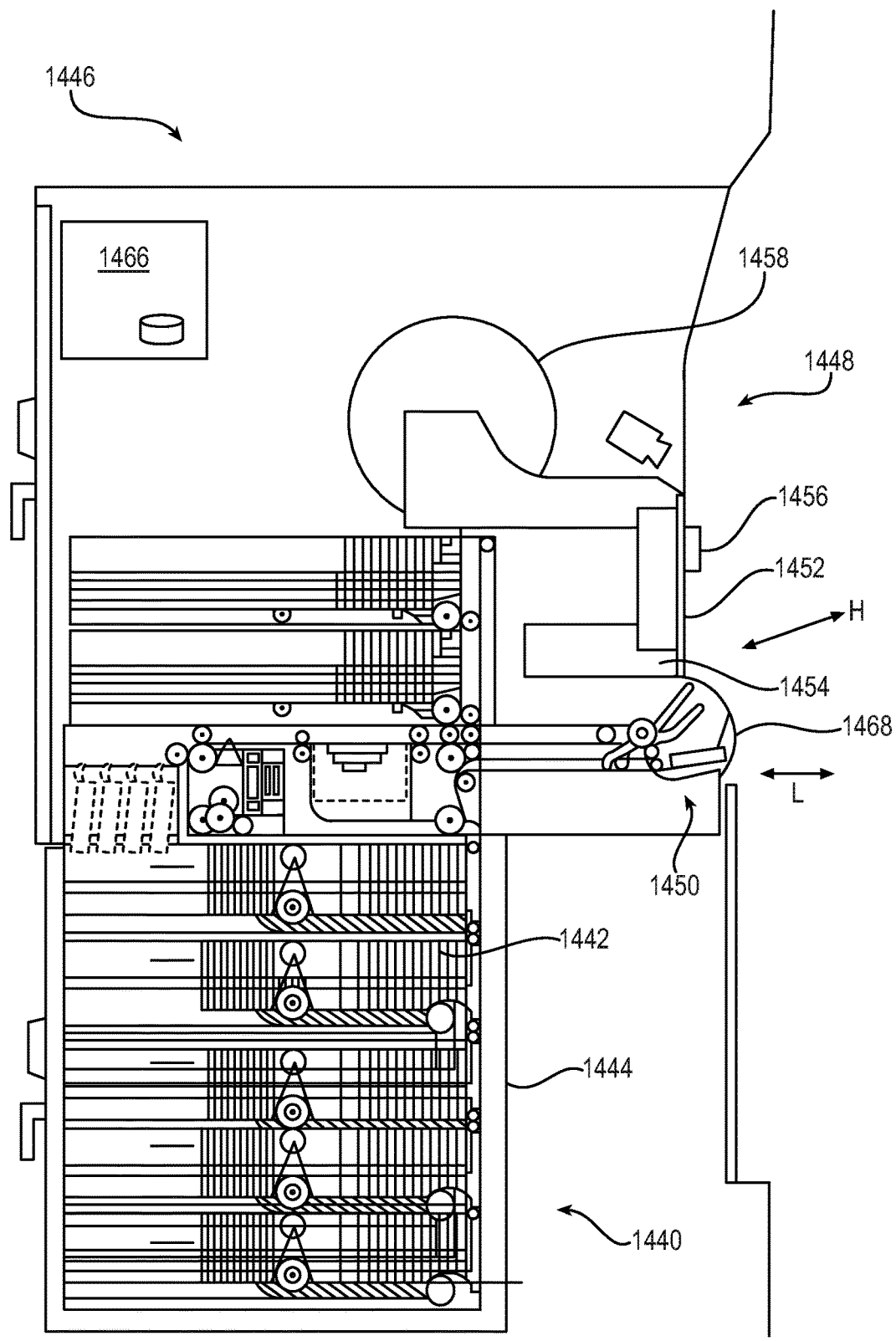
FIG. 2 is a schematic view of an alternative automated banking machine.

FIG. 2 shows an alternative example embodiment of automated banking machine 1440. Automated banking machine 1440 is configured as a through-the wall machine which enables conducting transactions by a user positioned externally of a wall or other area in which the machine is positioned.

Machine 1440 also includes recycling mechanisms 1442 that are positioned within a chest position 1444. An upper housing portion 1446 is in supporting connection with the chest portion. A user interface 1448 is provided for operation by users. The machine includes a sheet handling mechanism 1450 which in an example embodiment may be similar to sheet handling mechanism 1350. The machine further includes a display 1452, a card reader 1454, a keypad 1456 and a receipt printer 1458. The example machine further includes a camera 1460, a 1466, validation devices 1464 and other devices suitable for carrying out transactions.

In an example embodiment, the sheet handling mechanism 1450 includes a selectively movable gate 1468. Gate 1468 is selectively movable by one or more drives of the type previously discussed. In an example embodiment, the sheet handling mechanism is selectively operative to receive and deliver sheets in an angular position that is suitable for the particular user as represented by the arrows H and L. Thus, for example, if the automated banking machine 1440 is positioned adjacent to a drive-through lane, users in high vehicles such as pickup trucks may deliver and receive sheets from the sheet handling mechanism in an upwardly angled direction. Similarly persons in relatively lower vehicles may receive and deliver sheets in a generally horizontal or somewhat downward direction.

In example embodiments, the at least one processor 1466 of the machine may operate in accordance with its programming to evaluate the appropriate position for the sheet handling mechanism to accept and deliver sheets from and to individuals in a vehicle. This may be done, for example, responsive to analyzing ima.about.es captured through operation of one or more cameras 1460 to determine the relative vertical position of an individual positioned adjacent to the machine in a vehicle. Alternatively, the at least one processor may be operative in accordance with its programming to evaluate locations of various features of the vehicle such as a sill of a door, the top of the roof or other vehicle feature that is indicative of the vehicle height. The at least one processor may then operate in accordance with its programming to adjust the operation of the sheet handling mechanism to the appropriate level.

Alternatively or in addition, the example automated banking machine 1440 may operate using features of the type described in U.S. Pat. No. 8,220,706, the disclosure of which is incorporated herein by reference in its entirety. Such example embodiments of the machine may operate to locate the position of the user's eyes by analyzing images that are captured through one or more cameras 1460. The user's eye position may then be tracked so as to determine the appropriate position for the sheet handling mechanism to receive and deliver sheets. Such features may be used in machines in drive-through or in interior units which can more effectively receive and deliver sheets to persons of varying heights and/or in wheelchairs. Alternatively and/or in addition, the machine may also operate in the manner of the incorporated disclosure to receive user inputs through eye tracking analysis and to have such user inputs control one or more aspects of machine operation. Of course these approaches are just examples and in other embodiments other approaches may be used.

Figure 3:
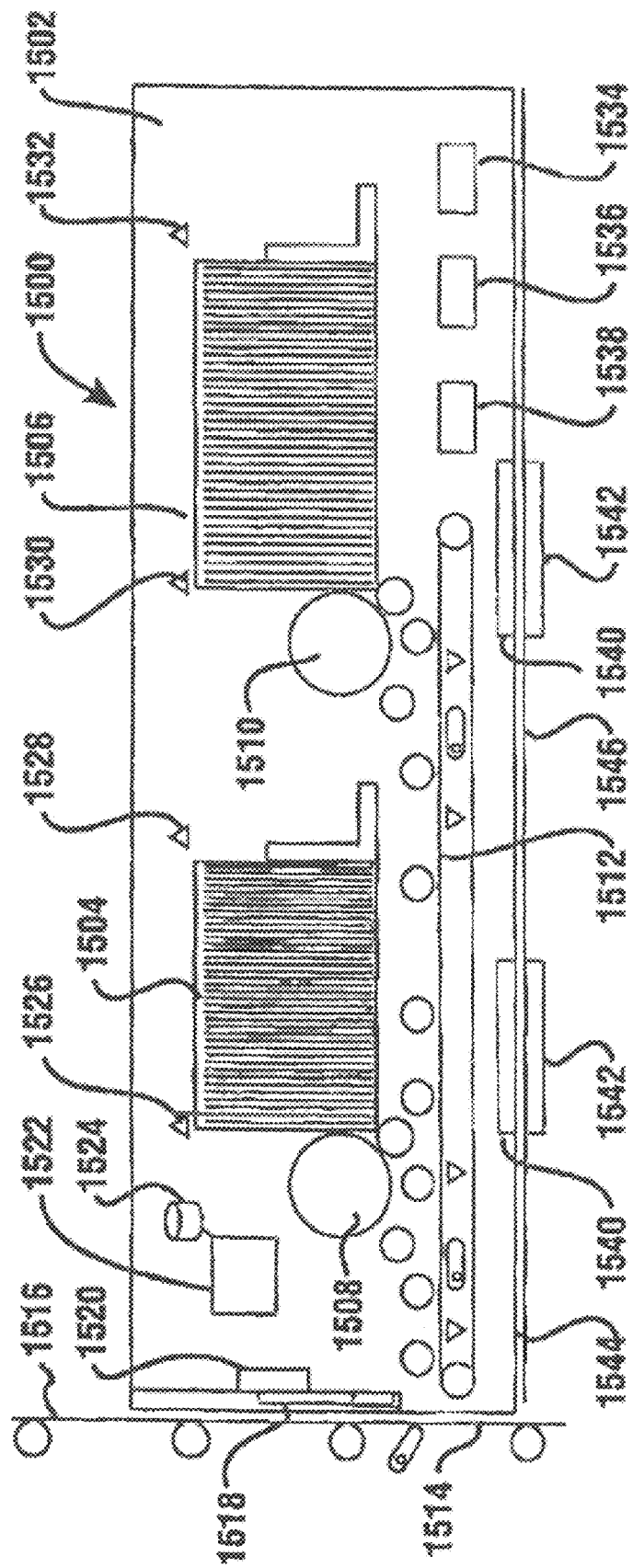
FIG. 3 is a cross-sectional schematic view of a document holding cassette that is usable in an automated banking machine.

FIG. 3 shows an example embodiment of a cassette 1500 usable in certain embodiments of automated banking machines. It should be understood that for purposes of this disclosure, the terms cassettes and containers are used interchangeably. Automated banking machines may include a plurality of cassettes. In the illustrated example, cassette 1500 is a document holding cassette from which documents may be dispensed and into which documents may be received. Of course, it should be understood that the principles described can be used in connection with cassettes which operate only to dispense documents, as well as cassettes which operate only to receive documents. Cassettes which operate to receive documents may be like those described in U.S. patent application Ser. No. 13/461,258 filed May 1, 2012, the disclosure of which is incorporated herein by reference in its entirety. Of course, numerous different types of cassette mechanisms and structures may be used, depending on the particular type of automated banking machine involved.

The example cassette 1500 includes an interior area 1502 in which documents are stored. In this example cassette, two stacks of documents 1504 and 1506 are shown. These documents may be sheets such as currency bills, checks, vouchers, gift cards, coupons or other items, depending on the nature of the machine and the transactions to be carried out. The example cassette also includes within the interior area two mechanisms 1508 and 1510. These example mechanisms operate to stack sheets in a document stack and to selectively pick sheets from a document stack. In some embodiments, these stacking and picking mechanisms may include features like those shown in U.S. Pat. No. 6,331,000, the disclosure of which is incorporated herein by reference in its entirety. The example mechanisms are operative to selectively remove bills from the associated stack that they can be moved via a transport 1512 to an opening 1514. The documents can be moved from the opening out of the cassette and into engagement with another transport 1516, which can carry the documents to another location within the machine for handling. Likewise, documents carried on transport 1516 can be directed into the opening 1514 and carried by the transport 1512. Documents in engagement with transport 1512 that are incoming to the cassette may be selectively directed to either of the stacker-picker mechanisms 1508 or 1510. Engagement of the sheets with the mechanism operating in the stacking mode will cause the sheet to be stored in aligned relation in the respective document stack. It should be noted that while the example cassette includes two stacking and picking mechanisms, other cassettes may include different numbers of such mechanisms, or mechanisms that receive documents, dispense documents or perform both functions. Some example embodiments may include features disclosed in U.S. Pat. No. 7,891,554, the disclosure of which is incorporated herein by reference in its entirety.

The example cassette 1500 also includes a number of other features and components. A gate 1518 which opens and closes opening 1514 is selectively movable by an actuator 1520 in the cassette. The actuator 1520 operates to move the gate between the open and closed positions. The actuator may be operated to cause the gate to be in the closed position when the cassette is removed from the machine. Closing the gate may secure the cassette so that it can be transported in a manner where it houses documents while minimizing the risk of unauthorized access to and removal of the documents. In an example embodiment, the actuator may include an electro-mechanical actuator, such as a solenoid, a motor, a cylinder, or other driving mechanism that is suitable to impart movement. Further, the example cassette may include other types of actuators, such as motors for moving components of the stacking and picking mechanisms, driving components of the transports, and the like.

The example cassette 1500 further includes at least one processor 1522, which is in operative connection with at least one data store 1524. At least one processor included in the cassette is part of internal cassette circuitry, which is operative to execute computer executable instructions stored in the at least one associated data store. The example at least one processor 1522 also operates to receive and store data. An example embodiment further operates to cause data to be delivered from the cassette in a manner that is hereinafter discussed.

The example cassette 1500 further includes a number of sensors 1526, 1528, 1530 and 1532. These sensors which are shown schematically may be used for a number of different purposes within cassettes of various types. For example, sensors may be used to sense the position of documents within the stacks or documents that move along the transports. Sensors may also be used to detect the positions of gates, picker mechanisms, stacker mechanisms or other structures that are movable within the machine. Sensors may also be used in some embodiments to detect the status of lids, gates, diverters or other items on the cassettes. Other sensors may be used for purposes of detecting motion, cassette orientation or other aspects of the cassette or its components. For purposes hereof, sensors may include optical sensors, magnetic sensors, Hall effect sensors, sonic sensors, thermal sensors, vibratory sensors, proximity sensors, and any other type of sensor that is usable in connection with detecting a particular condition that needs to be detected within the particular cassette.

The example cassette also includes additional features that may be usable in the operation of the cassette or the automated banking machine. For example, these additional features may include a battery 1534. The battery 1534 may in some embodiments be a rechargeable and in others a non-rechargeable battery. The battery may be usable for purposes of powering the cassette circuit, actuators, sensors or other items within the cassette. Other example items may include a document destruction device schematically indicated 1536. The document destruction device 1536 may include a device that is selectively activated to destroy the cassette 1500 and/or documents therein in response to signals given in response to the detection of certain conditions. The document destruction device may include for example, a dye pack, incendiary device or other device suitable to render the documents in the cassette 1500 unusable or destroyed in response to actuation thereof. Such a document destruction device may be actuated in circumstances where it appears that the cassette has been misappropriated or stolen, either with or separate from the automated banking machine.

Other example embodiments may include other features which may be usable in connection with the operation of the machine or the processing of documents. This may include for example, a communication device schematically indicated 1538. The communication device 1538 may in some embodiments include an RF type communication device that can send and/or receive data. Some cassettes with a communication device may communicate with other devices within the machine. Alternatively, or in addition, in other embodiments the communication device may include a cellular modem or other wireless communication device that can communicate separate from the automated banking machine. Such features may be used for purposes of communicating data regarding documents housed within a cassette to the circuitry within an automated banking machine. In other arrangements, the communication device may operate to communicate the whereabouts of the cassette during transport or in operation so that the cassettes and the documents therein can be tracked and accounted for during machine operation, cassette loading and/or transport. Numerous items of data useful in connection with tracking and managing currency bills or other documents may be communicated through operation of communication devices. Of course example cassettes may include other devices as appropriate or useful in connection with their operation.

The example cassette 1500 includes at least one coil schematically indicated 1540. Coil 1540 is in operative connection with the cassette circuit, and in an example embodiment is in operative connection with the processor, data store, sensors and other devices that are in connection with the cassette circuit. Although some example cassettes will have only one such coil and associated circuit, other example cassettes may include multiple coils and circuits therein as is appropriate for the functions carried out by the cassette circuits. In the operative position of the cassette 1500 within the machine, each coil 1540 is in proximity with a machine (or primary) coil 1542. Coil 1542 is an electrically energized coil that is associated with at least one driver circuit of the automated banking machine. The energized coil or coils 1542 are operative to create electromagnetic fields that are operative to produce electrical power in the coil or coils 1540 through inductance. In this way, the cassette circuit and devices connected thereto may be electrically powered without the use of wired connectors or similar items that require additional labor to connect and disconnect when cassettes are installed and removed from the machine. Further, in some embodiments, such wireless connectivity may also provide greater reliability by not having wire connectors which can break, separate or otherwise malfunction. In the example arrangement shown, the respective coils associated with the machine and the cassette may be positioned adjacent to one another such that there is a small air gap, which in an example embodiment is in the range of 10 millimeters. The coil or coils 1540 may be positioned adjacent to a bottom surface 1544 of the cassette while the coil or coils 1542 are positioned adjacent to supporting surface 1546, which supports the cassette in the operative position within the interior area of the machine. Of course, this arrangement is example and other coil arrangements and positions may be used.

In an example embodiment, the electrical characteristics which can be produced in the coils are also used for communication between circuits in the machine and the cassette. This is done in the manner hereinafter described so as to enable the machine to communicate instructions and/or data to the cassette 1500, and the cassette 1500 to communicate data and/or instructions to the machine. In an example embodiment, a driver circuit associated with the coil 1542 or coils in the machine operates to selectively vary the magnetic intensity produced by the coil in ways that can be detected as changes in the electrical properties of the coil or coils in the cassette. These variations can be interpreted as binary data which corresponds to transmitted information which can be detected and utilized by the cassette circuit. Further in an example embodiment, the cassette circuit operates responsive to the processor to vary a resonant frequency of the coil or coils 1540 associated with the cassette. This variation of the resonant frequency is detectable through operation of the associated machine coils 1542 so that data in a binary form can be received and utilized in operation of the machine.

Figure 4:
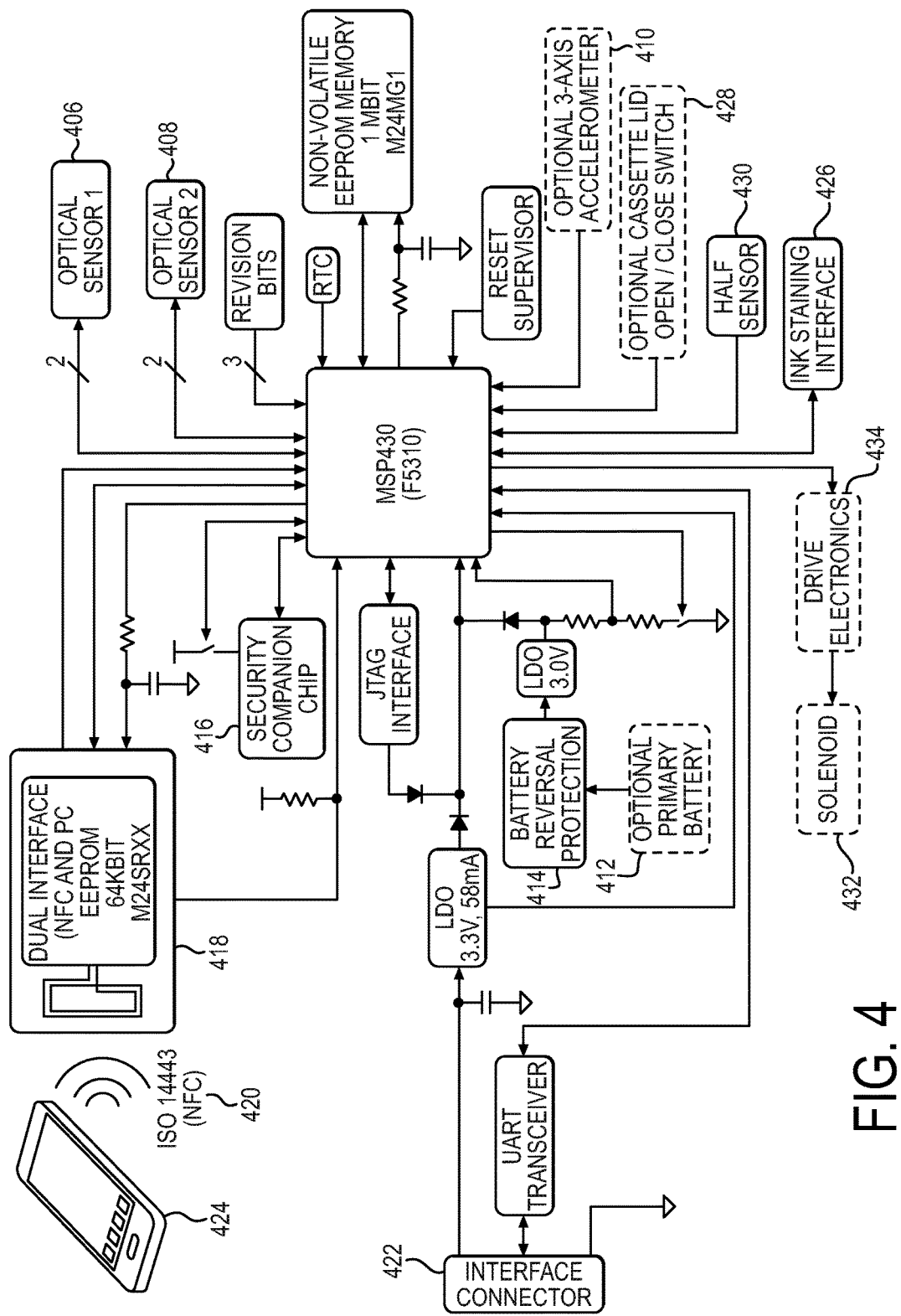
FIG. 4 is a schematic diagram of an electronic circuit configuration for an automated banking machine cassette as disclosed herein.

An example of a wireless cassette interface electronics is shown schematically in FIG. 4, and comprises a circuit 400 card with a microprocessor 402, non-volatile memory 404, optical sensors 406, 408, accelerometer 410, battery power 412 and voltage protection 414, security chip 416, a wireless interface 418, for example a general purpose output such as a dual interface Near Field Communication and Inter-Integrated Circuit (NFC and I2C) Electrically Erasable Programmable Read-Only Memory (EEPROM), for example an (International Organization for Standardization) ISO 14443 NFC and an interface connection 420. The power for the cassette electronics may be supplied by one or more batteries sources 412 within the cassette or from a power supplied from an interface 422 the exterior of the cassette such as via a physical electrical connection of the cassette to ATM circuitry, or by wireless connectivity such as inductive coil connection between the cassette and an ATM, as disclosed for example in the commonly owned co-pending U.S. Patent Application Publication No. 2014/0263619, the entire disclosure of which is hereby incorporated by reference. In an example embodiment, optical sensor 406 can be used to detect thumper pick position. The optical sensor 408 can be used to detect an empty stack.

In an example embodiment, this provides an ATM cassette communication channel for ATM owners, bank and financial institution employees, service technicians and cash handlers with greatly improved ease of use and information accuracy and security over the prior art. The wireless cassette interface 418 is fully functional with cassettes removed from an ATM, by connection to smart phones (e.g., smart phone 424) or other NFC compliant devices, to enable real-time and continuous tracking. The cassette data software is programmed to continuously record and store cassette contents and usage history for defined periods and/or over the cassette lifetime.

Further in accordance with the disclosure, wireless communication interface 418 is provided for communication with ATM cassettes while installed in an ATM. Data is sent from one or multiple cassettes via a wireless communication connection such as NFC protocol at a position on the exterior of an ATM. To initiate cassette communication or interrogation, a programmed wireless device such as a smart phone 424 is placed in close proximity to or in contact with the cassette 400 (or exterior of an ATM). An application on the wireless device 424 for communication with cassettes establishes a communication link 420 for exchange of data with one or more cassettes 400. Security features such as encryption, password protection, digital handshake can be incorporated into the software to control information access to cassettes. Cassette data that is acquired by one or more devices 424 via a wireless connection can be temporarily stored on the device(s) 424 and then transmitted by the device(s) 424 at any time to a central network or cloud service for post aggregation of data from multiple devices, for example throughout a bank branch or for a geographic region.

In accordance with another aspect of the present disclosure, ATM cassettes and media cassettes are configured with an external programmable display 426 for displaying and indicating the content and other data about a cassette on the exterior thereof. In an example embodiment, the external cassette display 426 is an Electrophoretic Display such as, for example E INK™ (which has a film containing electro-optic material which changes in the presence of an electric field), which can be programmed to form and display any type of symbols, graphics, hieroglyphics, numbers and characters. The external cassette display 426 can be driven, programmed or controlled by circuitry which is also contained circuit card 400 (that may be on the internally mounted in the cassette which contains the wireless communication circuitry. Electrophoretic displays provide the advantages of minimal power consumption required to alter or program the display, and zero power consumption once the display is set in a desired state or format.

In particular embodiments, a cassette may further optionally include a cassette lid sensor 428, a feed wheel switch 430, a feed wheel lock (solenoid) 432 and associated drive electronics 434. The cassette lid sensor 428 can function as an open/close sensor with a loop back for presence detection. The feed wheel switch 430 can also be arranged with a loopback for presence detection. Those skilled in the at should readily appreciate that any voltages or other components that are illustrated are merely for ease of illustration as any suitable voltage may be employed depending on the circuit design.

Figure 7:
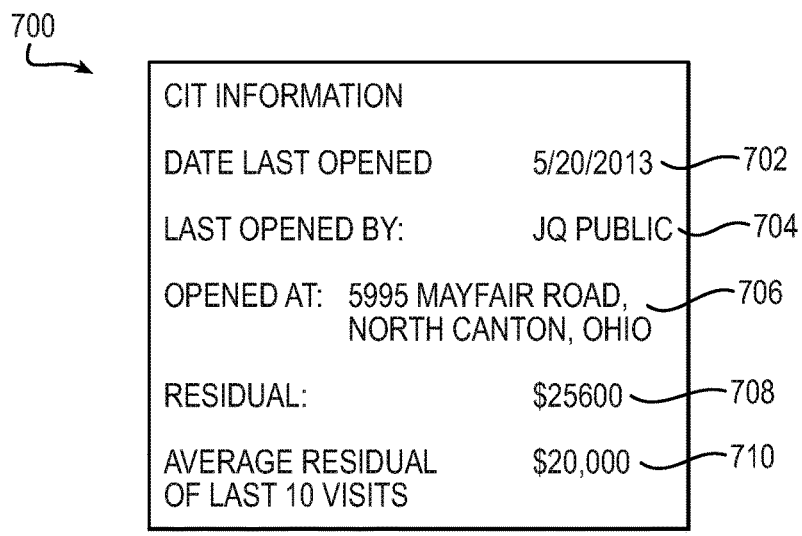
FIG. 7 is representative display of an application for wireless communication with an ATM cassette as disclosed herein.

FIGS. 5-7 illustrate representative user interfaces of a wireless cassette communication application. With the application installed on a suitable wireless device such as a smart phone, an initial display 500 shown in FIG. 5 is generated which displays the detected cassette, for example by serial number or 502 by any other identifier, such as an associated ATM 504 or terminal, currency identification (e.g. country 508 and denomination 506), note count 510 and total cassette content monetary balance 512. The display content, format and sequence may be in any suitable configuration or arrangement. Additional information, graphics or data may also be displayed such as financial institution identity, ATM/cassette manufacturer, date, time, etc. The display may also include a menu of additional application features and functions and pages, for example for viewing cassette metrics 514, updating counts 516, updating cassette info 518 or other cassette related data. The currency country 508 may be displayed either as text (e.g., country name or a code) or a graphic such as a flag representative of the country.

FIG. 6 illustrates a representative wireless device cassette communication application display page for cassette metrics 600 including for example, but not limited to, lifetime operation log of sheets dispensed 602, cassette insertions 604, feed fails 606, dispense discrepancies such as doubles 608, feed fails 610 and doubles 612 since last installation or visit, tamper detection 614 and battery status 616. As shown in FIG. 5, an "Update Cassette Info" page of the application is provided for entering data on any change in cassette status, for example following a re-load or change in currency or denomination.

FIG. 7 illustrates a representative "cash-in-transit" (CIT) page display 700 of the wireless device cassette communication application, which in the representative format displays a date on which the cassette was last opened 702, identity of the person or firm that accessed the cassette 704, a location where the cassette was opened 706, a residual monetary value of cassette contents 708, and an average of a residual monetary amount, 710 for example calculated from the last 10 visits or cassette openings.

Figure 8:
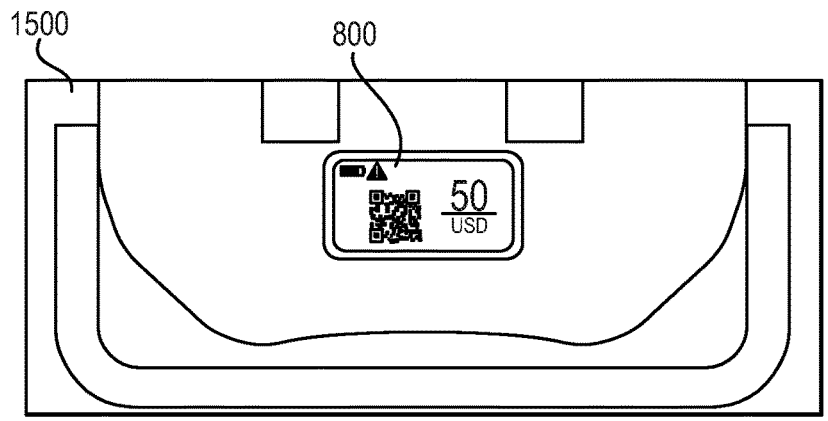
FIG. 8 is an example of an image of an external cassette display in accordance with an example embodiment.
Figure 9:
FIG. 9 is an example of an image of an external cassette display in accordance with an alternative example embodiment.

As shown in FIGS. 8 and 9 the cassette displays, indicated generally at 800, 900 respectively may be located at any location on or in the cassette exterior structure, such as a side or end wall. As shown, the displays 800, 900 may be generally rectangular or in any other shape and in any suitable size. In the representative embodiment shown, the displays 800,900 are generally rectangular with approximate dimensions of 1 inch height and 2 inch width. As shown on the display 800, cassette information such as currency type 802, country of origin and denomination 804 is displayed as programmed and remains so until re-programmed by operation of the wireless application. The display as set by the program remains in that state whether the cassette is installed or not installed in an ATM. Additional information and/graphics or symbols which may be presented by the display include but are not limited to a battery power level indicator icon or symbol, other status indicators or icons, scan codes such as QR codes 806 or bar codes, a financial institution name or acronym and corresponding trademark or logo 902, as shown. As described in FIG. 4, the circuitry in the cassette contains a NFC antenna and chip which enables a NFC compliant device to communicate with the cassette circuit card. Information can be passed through the NFC compliant mobile device to the cassette and update the cassette display as desired.

Alternatively, the display content can be updated or changed by an existing cassette connector interface with an ATM which delivers power to the cassette when installed in an ATM and provides a communication channel for cassette information to be exchanged between the cassette and the ATM.

ATM cassettes can be manufactured in original form with the described wireless communication circuitry, power source and external display, and existing cassettes can be retro-fitted with these components irrespective of the original manufacturer.

In another example embodiment of the present disclosure, money transit bags can be equipped with wireless communication circuitry and power source for wireless digital tracking and recording, for example in substantially the same configuration as described in connection with ATM cassettes. For example, the communications circuitry previously described can be incorporated into the structure of a money transit bag, and programmed in any desired configuration such as to uniquely identify the bag, its ownership, predetermined pick-up and delivery points, and data recorded at any time by the cooperating wireless device on bag contents, location and status.

In an example embodiment, a cassette display is of the electronic ink type that uses an electrophoretic display, the movement imparted by an electric filed to charged particles that are suspended in a liquid. In general and as known in the art, electronic ink is created by a liquid substance that responds to electrical impulses to enable changeable text and image displays on a flexible surface. The electronic ink can include millions of tiny "switchable" microcapsules or cavities. The microcapsules can be of transparent polymer. The microcapsules can be suspended in a liquid carrier medium that allows them to be printed. The microcapsules can be about 100 microns wide. Each microcapsule can be filled with an ink or oily substance (dark dye), along with hundreds of pigmented chips (or balls or particles) which have a positive or negative charge and which can move or float inside the microcapsules. For example, the chips may be white and the ink blue.

A microcapsule (not shown) may be positioned adjacent a single electrode or positioned between two electrodes to receive an electric charge. When an electrical charge is applied to a microcapsule, the chips therein move either to the top or the bottom of the microcapsule (depending on the applied polarity of the charge and the charge of the chips). When pulled/pushed to the top, white chips make the microcapsule look white. This makes the surface of a card appear white to a viewer at that spot. When white chips are pulled/pushed to the bottom, then only the dark ink is viewed (at the top of the microcapsule). This makes the surface of a card appear darker to a viewer at that spot. A pattern of charges applied in concert enables a card to have a display of images and text. Patterns of white and dark can be created on a large scale (such as the size of a card) to form on a card black words and sentences on a white background (or vice versa).

It should be understood that alternative arrangements of microcapsules may be used. For example, microcapsules can be used that contain chips of different colors. Dark chips can take the place of dark liquid in representing a dark surface. Microcapsules can have positively charged white pigment chips and negatively charged black pigment chips (or vice versa) suspended in a clear fluid. The white particles can be a solid sphere of white titanium dioxide. The microcapsules can be positioned (printed) between thin, flexible electrodes, e.g., a top transparent electrode and a bottom electrode. When a (top) negative electric field is applied or generated, the white particles (e.g., chips) move to the top of the microcapsule where they become visible on the display surface. An opposite (bottom, positive) electric field can pull the black particles to the bottom of the microcapsule where they are hidden from view. The capsules become visible as white. When charge is reversed, the particles are moved to make the capsules appear darker. Suspended in a liquid such as water, the microcapsules can be printed on a surface or an electrode-bearing material just like regular ink. Different particle/chip and electrode arrangements may also be used. For example, an arrangement may include positively charged black chips and negatively charged white chips.

Figure 10:
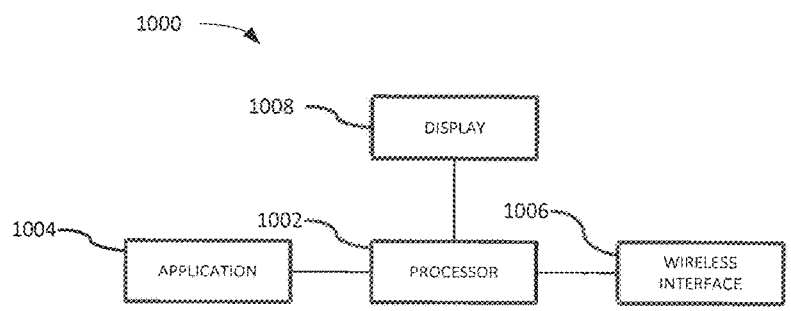
FIG. 10 is a block diagram illustrating an example of a wireless device operable to configure an electrophoretic display coupled with a cassette via a wireless interface.

FIG. 10 is a block diagram illustrating an example of a wireless device 1000 operable to configure an electrophoretic display (e.g., electrophoretic display 426 in FIG. 4, electrophoretic display 800 in FIG. 8, and/or electrophoretic display 900 in FIG. 9) coupled with a cassette via a wireless interface 1006. The wireless interface 1006 may employ any suitable wireless protocol such as, including but not limited to, NFC, WIFI, I2C, BLUETOOTH, Infrared, optical, or any combination of protocols for communicating with the electrophoretic display. A processor 1002 that is operable to execute an application 1004 sends the configuration instructions to the electrophoretic display. A display 1008 is operable to display data received from the cassette, for example the data illustrated in FIGS. 5-7.*i*

Figure 11:
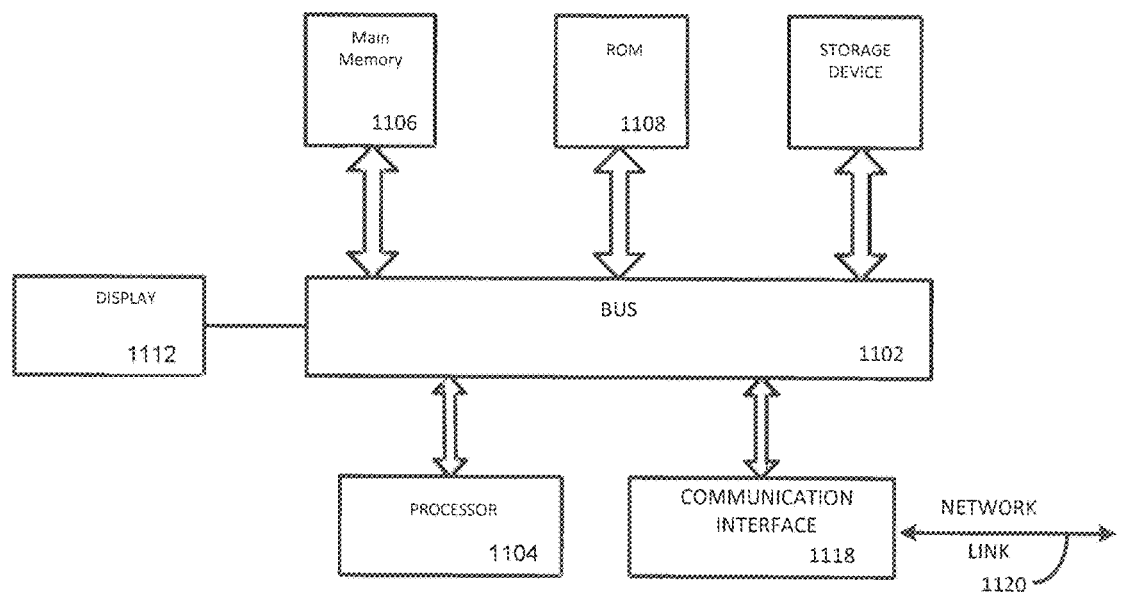
FIG. 11 is a block diagram of a computer system upon which an example embodiment may be implemented.

FIG. 11 is a block diagram of a computer system upon which an example embodiment may be implemented. Computer system 1100 includes a bus 1102 or other communication mechanism for communicating information and a processor 1104 coupled with bus 1102 for processing information. Computer system 1100 also includes a main memory 1106, such as random access memory (RAM) or other dynamic storage device coupled to bus 1102 for storing information and instructions to be executed by processor 1104. Main memory 1106 also may be used for storing a temporary variable or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112 such as a cathode ray tube (CRT) or liquid crystal display (LCD), for displaying information to a computer user. For example, display 1112 may be employed to an electrophoretic display 426 in FIG. 4, electrophoretic display 800 in FIG. 8, and/or electrophoretic display 900 in FIG. 9. In another example embodiment, the display 1112 may be employed to implement display 1008 in FIG. 8.

An aspect of the example embodiment is related to the use of computer system 1100 for implementing either or both of the wireless cassette 400 (FIG. 4) and the wireless device 800 (FIG. 8). According to an example embodiment implementing either or both of the wireless cassette 400 (FIG. 4) and the wireless device 800 (FIG. 8) is provided by computer system 1100 in response to processor 1104 executing one or more sequences of one or more instructions contained in main memory 1106. Such instructions may be read into main memory 1106 from another computer-readable medium, such as storage device 1110. Execution of the sequence of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1104 for execution. Such a medium may take many forms, including but not limited to non-volatile media. Non-volatile media include for example optical or magnetic disks, such as storage device 1110. Some examples of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 1100 also includes a communication interface 1118 coupled to bus 1102. Communication interface 1118 provides a two-way data communication coupling computer system 1100 to a network link 1120. In particular embodiments, the network link 1120 is a wireless link, such as a NFC, WIFI, I2C, BLUETOOTH, Infrared, or optical link. The communication interface 1118 may be operable to communicate using NFC, WIFI, I2C, BLUETOOTH, Infrared, optical, or any combination of protocols.

Described above are example embodiments. It is, of course, not possible to describe every conceivable combination of components or methodologies, but one of ordinary skill in the art will recognize that many further combinations and permutations of the example embodiments are possible.

Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a cassette operable to store documents, the cassette having an external surface;
an electrophoretic display coupled with the external surface; and
a wireless interface coupled with the cassette and operably coupled with the electrophoretic display;
a processor coupled with the electrophoretic display and the wireless interface;
the processor is operable to receive data representative of contents of the cassette wirelessly from an external device via the wireless interface; and
the processor is operable to cause the electrophoretic display to output data representative of the data representative of contents of the cassette.

2. The apparatus set forth in claim 1, wherein the data representative of contents of the cassette comprises data representative of a country of origin for currency stored within the cassette.

3. The apparatus set forth in claim 1, wherein the data representative of contents of the cassette comprises data representative of a denomination of a currency stored within the cassette.

4. The apparatus set forth in claim 1, wherein the data representative of contents of the cassette comprises data representative of a financial intuition.

5. The apparatus set forth in claim 1, wherein the data representative of contents of the cassette comprises data causing the electrophoretic display present data in the form of a bar code.

6. The apparatus set forth in claim 5, wherein the bar code is a quick response (OR) code.

7. The apparatus set forth in claim 1, wherein the wireless interface is a near field communication (NFC) compatible interface.

8. The apparatus set forth in claim 1, wherein the wireless interface is a inter-integrated circuit (I2C) compatible interface.

9. The apparatus set forth in claim 1, wherein the wireless interlace is operable to communicate with both near field communication (NFC) and inter-integrated circuit (I2C).

10. The apparatus set forth in claim 1, further comprising a processor, wherein the processor is operable to provide cassette data to a wireless device associated with the wireless interface.

11. The apparatus set forth in claim 10, wherein the cassette data comprises a selected one of a group consisting of a serial number of the cassette, a denomination of currency stored in the cassette, a country of origin for currency stored in the cassette, a note count, a balance of currency stored in the cassette.

12. The apparatus set forth in claim 10, wherein the cassette data comprises cassette metrics comprising a selected one of a group consisting of number of sheets dispensed, number of cassette insertions, a lifetime number of feed fails, a life time number of double sheets dispensed, a number of feed fails since a last visit, a number of doubles since the last visit, an indication of whether tampering was detected, and a current battery status.

13. The apparatus set forth in claim 10, wherein the cassette data comprises case in transit data comprising a selected one of a group consisting of when the cassette was opened, a residual monetary value of cassette contents, and an average of residual monetary.

14. The apparatus set forth in claim 1, further comprising:
a picking mechanism for picking a sheet from a stack of sheets within the cassette;
a second wireless interface coupled with the processor, the second wireless interface is operable to receive instructions from an automated banking machine to pick the sheet, and the processor is responsive to the instruction received at the wireless interface to cause the picking mechanism to pick the sheet; and
a third communication interface operable to communicate data representative of a location of the cassette during transport.

15. A tangible, non-transitory computer readable medium of instructions comprising computer readable instructions encoded thereon for execution by a processor and when executed operable to:
receive data representative of cassette contents via a wireless interface coupled with a cassette from an external device in data communication with the wireless interface; and
operate an electrophoretic display coupled with an exterior surface of the cassette to output data representative of the data representative cassette contents responsive to receiving the data representative of cassette contents from the wireless device in data communication with a wireless interface.

16. An apparatus, comprising:
a wireless interface; and
a processor coupled with the wireless interface;
wherein the processor is operable to obtain data representative of contents of a cassette;
wherein the processor is operable to communicate the data representative of the contents of the cassette via the wireless interface with an electrophoretic display coupled with an exterior surface of the cassette cassette, the cassette is operable to store documents and one of a group consisting of dispense and accept documents; and
wherein communicating the data representative of the contents of the cassette is operable to cause the electrophoretic display to output data representative of the data reperesentative of the contents of the cassette.

17. The apparatus set forth in claim 16, wherein the data representative of the contents of the cassette comprises data representative of a country of origin for currency notes stored in the cassette.

18. The apparatus set forth in claim 16, wherein the data representative of the contents of the cassette comprises data representative of a denomination of currency notes stored in the cassette.

19. The apparatus set forth in claim 16, further comprising:
a display coupled with the processor;
wherein the processor is operable receive data representative of cassette data that comprises a selected one of a group consisting of a serial number of the cassette, a denomination of currency stored in the cassette, a country of origin for currency stored in the cassette, a note count, a balance of currency stored in the cassette to be output on the display; and
wherein the processor is operable to cause the data representative of cassette data that comprises the selected one of a group consisting of the serial number of the cassette, the denomination of currency stored in the cassette, the country of origin for currency stored in the cassette, the note count, the balance of currency stored in the cassette to be output on the display.

20. The apparatus set forth in claim 16, further comprising:
a display coupled with the processor;
wherein the processor is operable to receive via the wireless interface data representative of cassette metrics comprising a selected one of a group consisting of number of sheets dispensed, number of cassette insertions, a lifetime number of feed fails, a life time number of double sheets dispensed, a number of feed fails since a last visit, a number of doubles since the last visit, an indication of whether tampering was detected, and a current battery status; and
wherein the processor is operable to cause the data representative of cassette metrics comprising the selected one of the group consisting of number of sheets dispensed, number of cassette insertions, the lifetime number of feed fails, the lifetime number of double sheets dispensed, the number of feed fails since the last visit, the number of doubles since the last visit, the indication of whether tampering was detected, and the current battery status.

\* \* \* \* \*

UNITED STATES PATENT AND TRADEMARK OFFICE
CERTIFICATE OF CORRECTION

PATENT NO. : 9,613,502 B2
APPLICATION NO. : 14/720906
DATED : April 4, 2017
INVENTOR(S) : Ken Turocy et al.

Page 1 of 1

It is certified that error appears in the above-identified patent and that said Letters Patent is hereby corrected as shown below:

In the Specification

In Column 11, at Line 33 please replace "the at" with --the art--

Signed and Sealed this
Twenty-third Day of May, 2017

Michelle K. Lee
*Director of the United States Patent and Trademark Office*